Dec. 23, 1941.    E. R. MORANDO    2,267,209
CABLE PAY-OUT AND TAKE-UP DEVICE
Filed Dec. 7, 1939
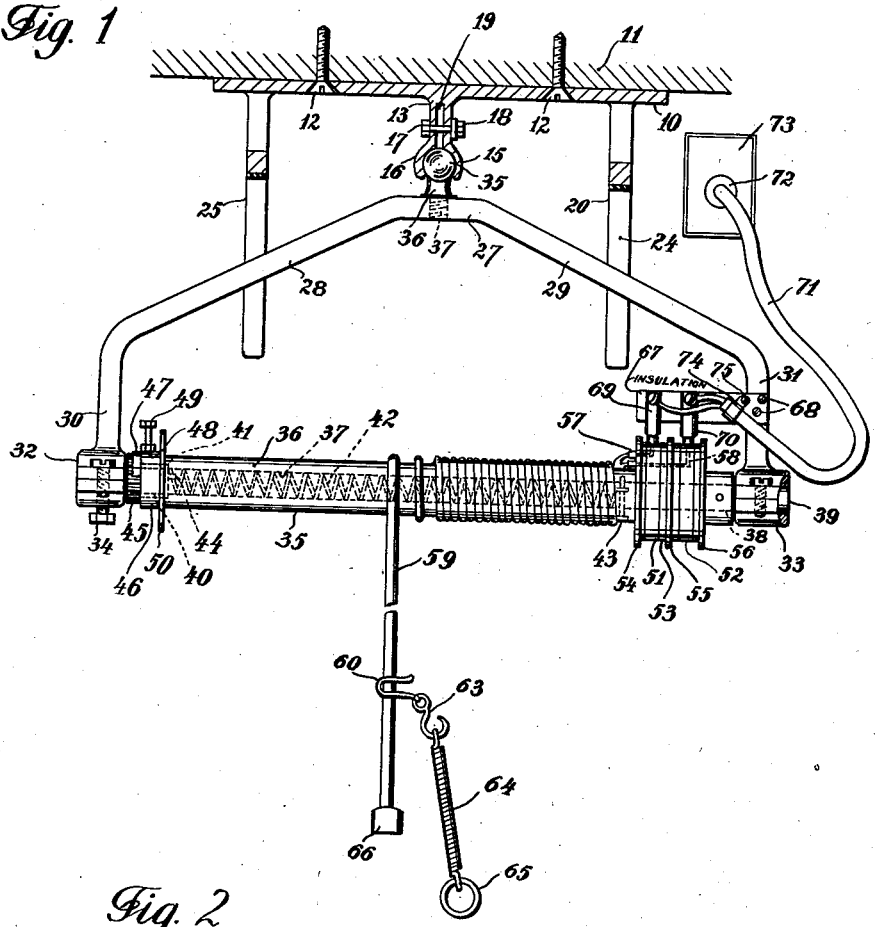
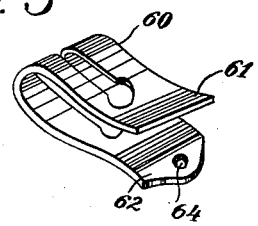
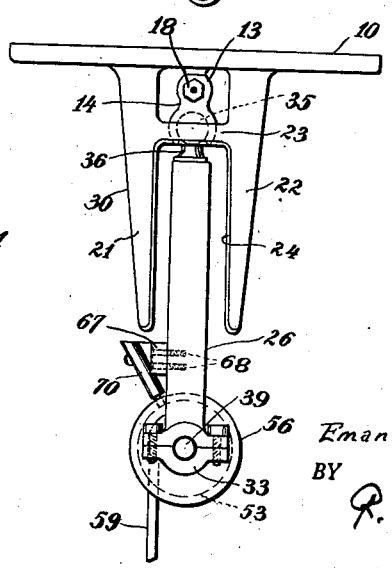
INVENTOR.
Emanuel R. Morando
BY
ATTORNEY.

Patented Dec. 23, 1941

2,267,209

UNITED STATES PATENT OFFICE 2,267,209

CABLE PAY-OUT AND TAKE-UP DEVICE

Emanuel R. Morando, Bronx, N. Y.

Application December 7, 1939, Serial No. 308,020

1 Claim. (Cl. 191—12.2)

This invention relates to improvements in cable payout and takeup devices and has for an object the provision of a device of such character to be mounted stationarily and yet pay out and take up a cable connected to and supplying current for operating a portable electrically driven mechanism.

Another object of the provision, in a device of the character stated, of a cylindrical roller for the electrical cable, and a frame supporting said roller, a swivel mounting for said frame, and means defining a path along which the frame may move on its swivel mounting.

A further object of the invention is the provision, in a device of the character stated of a reel for the cable, spring means within the body of the reel for effecting the taking up of cable paid out from said reel, and adjustable ratchet means for restraining the movement of the reel in the direction of the urge of the spring, the ratchet means being releasable by a quick pull and release of the cable when it is desired to take up the latter.

Yet another object of the invention is the provision of a spring loaded cable reel and novel means for winding up the spring to a wanted setting and locking it in such setting.

Other objects are directed toward simple arrangements for safeguarding the plug in connection between the cable and the machine, to which it is connected, against being pulled apart and breaking the circuit while the machine is being normally operated.

Referring to the drawing:

Figure 1 is a side elevation, partly in section, showing my new cable device mounted on the ceiling and having a feed cable therefor plugged into a convenient wall socket;

Figure 2 is an end elevation of the device shown in Figure 1, with the feed cable omitted for the sake of clarity; and Figure 3 is a perspective view of the cable clip shown in Figure 1.

Referring now to Figure 1, a plate 10 may be secured to a support, such as the ceiling 11 in any suitable manner, as by screws 12. Formed integral with the plate 10 is a boss 13 which supports a socket 14.

The socket 14 is split into two halves, 15 and 16 by a slot 19 which also extends into the boss 13. A hole at right angles to the slot accommodates a bolt 17 which in turn carries a nut 18, the purpose of which will presently be described.

An H shaped bracket 20 comprised of downwardly projecting legs 21 and 22 spaced apart from each other and joined by a cross web 23, is preferably formed integral with the base or plate 10, in spaced relation to the socket 14. The inner faces of the legs 21 and 22 up to the web 23, as well as the lower face of the web 23 may be covered by a strip 24 which may be of rubber, felt, or any other desired material.

A second H shaped bracket 25 which may be identically like the bracket 20 is also formed integral with the plate 10, and spaced apart from the socket 14.

A yoke 26 has an apex portion 27, angular portions 28 and 29 and vertical portions 30 and 31 made integral in the general form of an inverted V.

The vertical portion 30 terminates in a horizontal boss 32 and the vertical portion 31 terminates in a horizontal boss 33. The bosses 32 and 33 have central holes formed therein in alignment with each other. These bosses are split and are held together by means of screws as shown. The hole in the boss 33 forms a bearing for the reel shaft, to presently be described, and the boss 32 is adapted to hold its portion of the reel shaft stationary, a set screw 34 being provided for the purpose.

A ball 35 which fits the socket 14 has a shank portion 36 which shoulders against the apex 27 when the threaded extension 37 of the shank is screwed into the apex 27. The angular portions 28 and 29 are positioned between the legs of the H brackets 25 and 20 respectively and are retained between said legs at all times. By means of the bolt 17 and the nut 18 the "grip" of the socket on the ball may be adjusted, for example, so that the yoke may remain in any position into which it is moved.

A modification of the arrangement described contemplates the omission of the H yokes, thereby permitting the yoke to swivel in all directions. In such an event the "grip" of the socket on the ball would of necessity be tighter.

The cable reel generally designated by the numeral 35 consists of a tubular member 36 having a hole 37 extending longitudinally therethrough. A stud shaft 38 fits the hole 37 at one end thereof and is secured to the tubular member in any suitable manner. The end 39 of the stud shaft is journaled in the boss 33. The other end of the hole 37 is provided with a bushing 40, and a stud shaft has a portion 41 journaled in the bushing 40 and a portion of reduced diameter fitting the hole in the boss 32 and adapted to be secured therein by the set-screw 34 above referred to. A helical spring 42 is positioned in the hole 37 in the tubular member 36, one end being anchored by a through bolt 43 and the other end being secured to the stud shaft 41 by an anchor stud 44.

A ratchet wheel 45 is secured to the shaft 41, and a cup shaped member 46 has a hole therein riding the shaft 41 between the ratchet wheel 45, and the end of the tubular member and has a rim portion fitting the outside of the tubular member. A pawl 47 is carried on the cup member and engages the ratchet wheel 45. A boss 48 is carried by the rim and is threaded to accommodate a set-screw 49. This set-screw may be loosened and the cup may be turned to wind up the spring 42 to any desired tension after which it may again be tightened to retain the setting obtained.

A flange 50 is secured to the tubular member 36 near the cup shaped member, and near the other end are mounted metal slip rings 51 and 52 on a suitable double spool 53 having flanges 54, 55, and 56. A stud 57, connected to the ring 51 projects from the side face of the flange 54. A second stud designated by the numeral 58 is connected to the ring 52 and also projects from the side face of flange 54. The cable 59 carried on the reel has its two wires at one end connected to said studs, and has on its other end a suitable connector fitting 66 for connection to any portable or dirigible electrically driven device (not shown).

Slidable on the cable 59 is a hickey also shown enlarged in Figure 3. The hickey may be formed of hard or spring brass and when placed on the cable is normally locked, but may be released by pressing the ends 61 and 62 toward each other, after which it may be slid to any desired position and locked there by releasing said ends. A hook member 63 fits in the hole 64, and a spring 64 has one end secured to the hook 63 and its other end provided with a ring 65 which may be secured to the machine or device to which the fitting 66 is connected, the position of the clamp 60 being so adjusted to cause the cable between the clamp 60 and the fitting 66 to loop. This prevents the fitting from being disconnected as the device is moved about.

The reel works similar to a window shade roller, freely paying out cable as the latter is pulled, and taking up the cable under the power of the spring 42 when the cable is pulled and suddenly released (due to the pawl 47 releasing the ratchet under the urge of centrifugal force).

A bar 67 of insulating material is secured to the vertical portion 31 of the yoke by means of screws 68, and carries brush holders 69 and 70. The brush-holder 69 has a brush contacting the slip ring 51, and the brush-holder has a brush contacting the slip ring 52. A cable 71 carries a connector plug 72 on one end which may be plugged into the outlet 73, and the two wires of the cable are, at the other end, connected to the brush holders 69 and 70. A suitable clamp 74 engages the cable and is secured to the support 67 by means of a screw 75.

The ball and socket joint permits the yoke to swing to many positions on each side of the horizontal and due to the rugged construction of and novel arrangement of the parts, portable machines and other electrical devices may be used in connection with my new and improved reel almost with the same ease as if they had their own sources of power self contained.

The embodiment of the invention herein described is an example only and the showing is not intended to be limitative of the invention.

I claim:

A cable pay out and take-up device of the character described, a reel comprising in combination a hanger frame including an attaching plate having a depending socket bearing, a relatively movable yoke including opposed arms and having a ball bearing journalled in the socket, bearings formed on the ends of said arms, a revolvable spring roller having thereon a cable adapted to be wound and unwound, said cable having a vertically depending working end, stub shafts carried by said roller and disposed in the arm bearings, and guide means depending from said plate, said means having pairs of spaced legs disposed on opposite sides of said arms whereby to limit the movement of the yoke as said cable end is operated distant from the vertical position.

EMANUEL R. MORANDO.